United States Patent

Koestermeier

[11] Patent Number: 5,972,418
[45] Date of Patent: Oct. 26, 1999

[54] METHOD AND APPARATUS FOR THE MANUFACTURE OF A WORKPIECE HAVING A ROTATION-SYMMETRICALLY HARDENED SURFACE AREA

[75] Inventor: Karl-Heinz Koestermeier, Rietberg, Germany

[73] Assignee: Leico GmbH & Co. Werkzeugmaschinenbau, Ahlen, Germany

[21] Appl. No.: 08/992,792

[22] Filed: Dec. 18, 1997

[30] Foreign Application Priority Data

Dec. 18, 1996 [DE] Germany .......................... 196 52 836

[51] Int. Cl.$^6$ ................ B05D 3/12; B05C 11/00
[52] U.S. Cl. .................. 427/11; 427/180; 427/201; 427/359; 427/360; 118/76; 118/110; 118/308
[58] Field of Search ................ 427/11, 201, 180, 427/359, 360, 367; 118/304, 308, 321, 110, 76

[56] References Cited

U.S. PATENT DOCUMENTS 2,354,113   7/1944   Gould ............................ 118/308
3,397,732   8/1968   Howell, Jr. ..................... 118/321

Primary Examiner—Katherine A. Bareford
Attorney, Agent, or Firm—Oblon, Spivak, McClelland, Maier & Neustadt, P.C.

[57] ABSTRACT

In a method and an apparatus for the manufacture of a workpiece with a rotation-symmetrically hardened surface area, the workpiece surface area to be hardened is initially applied with a carrier film of pulverized alloying elements. A roll is radially infed to the carrier film, accompanied by the rotation of the workpiece. Under the influence of heat, the pulverized alloying elements of the carrier film are rolled into the surface area of the workpiece so that the alloying elements are intercalated into the workpiece surface and increase its hardness. For performing this method, the workpiece is clamped on a spindle driven in a rotary manner. A receiving hopper and an application device are radially spaced from the spindle and are interconnected by a supply device.

13 Claims, 1 Drawing Sheet

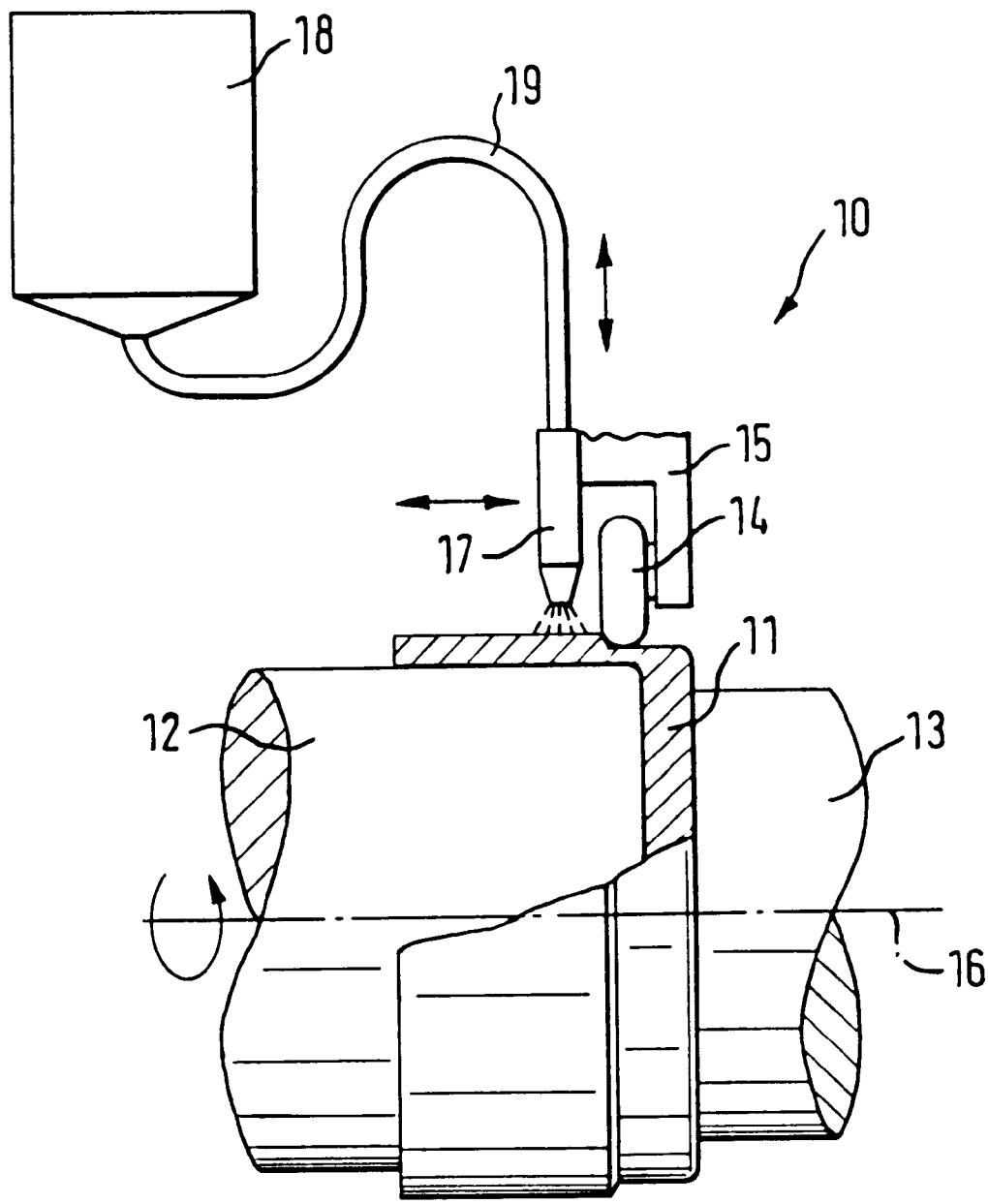

METHOD AND APPARATUS FOR THE MANUFACTURE OF A WORKPIECE HAVING A ROTATION-SYMMETRICALLY HARDENED SURFACE AREA

BACKGROUND OF THE INVENTION

1. Field of the Invention

The invention relates to a method and an apparatus for the manufacture of a workpiece having a rotation-symmetrically hardened surface area.

2. Description of the Related Art

Surface areas of metallic workpieces are hardened in order to increase the wear resistance of the surface areas exposed to increased stress. Numerous surface hardening methods, such as hardening in a heating furnace, nitriding by diffusing in nitrogen, or chroming, are known. In all these methods, the workpiece must be shaped prior to hardening. After hardening the workpiece geometry can scarcely be modified, or such modifications increase costs. In the aforementioned methods, there is a risk of an undesired, geometrical change to the workpiece due to thermal distortion or a nonuniform coating deposition, so that such methods are difficult to put into effect for the manufacture of dimensionally accurate workpieces. Finally, such methods can only be performed using special manufacturing apparatuses.

SUMMARY OF THE INVENTION

It is an object of the invention to provide a method and an apparatus with which it is possible to simply harden, with high dimensional accuracy, a rotation-symmetrical surface area.

According to one aspect of the invention, this and other objects are achieved by a method including the steps of applying a carrier film with pulverized alloying elements onto a rotation-symmetrical surface area of a workpiece to be hardened, rotating the workpiece about a rotation axis, radially infeeding and pressing at least one roll onto the carrier film on the surface area of the workpiece to be hardened, and rolling the pulverized alloying elements of the carrier film into the surface area of the workpiece to be hardened under the influence of heat, such that the alloying elements are intercalated in the surface of the workpiece and increase the hardness thereof.

A surface area to be hardened of a rotation-symmetrical workpiece, which has been previously shaped by cutting or otherwise, is firstly provided with a carrier film of pulverized alloying elements, so that the area to be hardened is covered with the pulverized alloying elements. In this way it is possible to form a uniform coating of alloying elements over the entire surface or only part thereof. As a result of the pressing force during the subsequent rolling in of the alloying elements, the necessary heat is generated, which aids the process of intercalating the alloying elements into the material matrix of the workpiece. During the rolling in of the alloying elements, the spinning roll simultaneously performs a calibration process, which largely avoids the risk of thermal distortion. In addition, during rolling in, surface roughness is reduced and the surface density improved, which leads to small tolerance ranges on the finished workpiece. Through the application of different alloying elements at different points of the workpiece, it is also possible to provide a differentiated hardness distribution on the workpiece surface.

The method can be performed with conventional manufacturing machines having a rotary spindle, e.g., a lathe, and a corresponding application and rolling-in apparatus. However, according to a particularly preferred embodiment of the invention, the rolling in of the alloying elements is performed on a spinning or flow-forming machine. Such a machine already has one or more spinning rolls, which can also be used for rolling in the alloying elements.

In an advantageous further development of the invention, before or during the rolling in of the alloying elements, the workpiece undergoes forming or working. In the case of the non-cutting forming of, e.g., a belt pulley or a toothed gear part on a spinning or flow-forming machine, in the same setting it is possible to carry out a surface hardening of the workpiece. Such a complete production of workpieces is economical, particularly due to the economizing on handling, transportation and storage times.

According to another embodiment of the invention, following the clamping of the workpiece in the spinning or flow-forming machine and with the workpiece rotating, the carrier film is applied to the surface area to be hardened. In this way a rapid and precise covering of the desired surface area of the workpiece with the carrier film is obtained.

According to another preferred embodiment, the surface area to be hardened is constructed as a profiled area and the pulverized alloying elements are rolled by means of a section roll into the surface area to be hardened. The profiled area can, in particular, be a tooth system for gear parts or a poly-V-section for belt pulleys. The section roll correspondingly has an external tooth system or a poly-V-outer section. The circumference of the section roll can have profiling in both the radial and axial directions. In addition, use can be made of several rolls with different profiling on a single workpiece.

For rapid, accurate application of the carrier film to the workpiece, the carrier film is applied by spraying the pulverized alloying elements onto the surface area to be hardened. Besides the pulverized alloying elements, the carrier film can also have an adhesive medium, which improves adhesion of the alloying elements to the workpiece surface prior to rolling in. It is also advantageous, for improving the intercalation of the alloying elements into the material matrix of the workpiece, that the surface area of the workpiece to be hardened is heated by means of a heating device. Such a heating device, which can be a burner, an induction coil or a heat radiator, is advantageous if the heat produced during the rolling in of the alloying elements is not adequate for the intercalation processes. Thus, the heat can be introduced during the rolling in step.

The method according to the invention is suitable for the introduction of different inorganic and organic elements into the material surface. A particularly good hardening is achieved through the use of metal carbides as the pulverized alloying elements.

Similar good results during hardening are achieved by using ceramic nanocrystals as the pulverized alloying elements. If necessary, it is possible to use different alloying elements on different workpiece areas on a single workpiece. As a result of this free choice of the pulverized alloying elements, it is possible in a planned manner to obtain a precisely defined surface hardness in specific workpiece areas.

According to other embodiments, the surface area to be hardened is constructed with a tooth system, particularly an internal tooth system, on a cylindrical or a conical surface.

According to another aspect of the invention, the above and other objects are achieved by an apparatus for the manufacture of a workpiece with a rotation-symmetrically hardened surface area which is hardened by pulverized alloying elements applied and rolled thereinto, comprising a spindle mounted to be rotatably driven about an axis, a clamping mechanism for clamping the workpiece on the spindle, at least one spinning roll displaceable radially to the spindle axis, a hopper for pulverized alloying elements, an application device radially spaced from the spindle for applying pulverized alloying elements from the hopper onto the surface area to be hardened of a workpiece clamped on the spindle, and a supply device which supplies the pulverized alloying elements from the hopper to the application device.

The apparatus can, in particular, be a conventional spinning or flow-forming machine, the receiving hopper, application device and supply device being fittable as a replaceable unit. For the precise application of the carrier film, the application device is axially and/or radially adjustable. The application device can in this way be positioned precisely in the vicinity of the surface area to be coated.

A particularly simple construction of the apparatus is achieved by the application device being mounted in common with the spinning roll. In this way the application device can be moved together with the spinning roll, which is conventionally located on a radially and axially movable support. The alloying elements can either be initially applied to the roll or directly to the workpiece area upstream of the roll.

According to a preferred embodiment, the application device is a nozzle for spraying the pulverized alloying elements. Through the spraying of the alloying elements, unnecessary friction during the application process is avoided. For spraying purposes, the alloying elements are conveyed through a pressurizing device, via the supply device, to the nozzle.

Thus, the method and apparatus according to the invention make it possible to very economically harden a workpiece with high dimensional accuracy.

BRIEF DESCRIPTION OF THE DRAWING

The single FIGURE shows a schematic partial cross sectional view of an apparatus in accordance with the invention.

DESCRIPTION OF A PREFERRED EMBODIMENT

The drawing shows the basic structure of an apparatus 10 for the manufacture of a workpiece 11, which is a cup-shaped circular blank. The circular workpiece 11 is rotationally symmetrical to a center axis 16 and was preformed by a deep drawing process on a press or by a flow forming process. The workpiece 11 is positioned on a spindle 12. By means of a clamping mechanism 13, i.e., a pressure cylinder, the workpiece 11 is axially pressed on and fixed at the spindle 12.

At least one spinning roll 14 is rotatably mounted on a support 15. While the spindle 12 and the workpiece 11 fixed thereon are driven in a rotary manner around a spindle axis, the spinning roll 14 is move radially via the support 15 to contact the outer side of the workpiece 11. A nozzle 17 is arranged on the support 15 near by the spinning roll 14 for applying a carrier film with pulverized alloying elements. The nozzle 17 is radially and axially movable together with the spinning roll 14. A tube 19 connects a container 18 with the nozzle 17 for supplying the pulverized alloying elements from the container 18.

A carrier film is generated by the pulverized alloying elements sprayed on the workpiece 11 upstream of the spinning roll 14 as the spinning roll moves relative to the axis of the workpiece, and is pressed by the spinning roll 14 into an upper surface area of the workpiece 11 while the workpiece 11 is shaped in a spinning or flow-forming process by the spinning roll 14. The alloying elements pressed into the upper surface area of the workpiece 11 increase the hardness of the surface of the workpiece 11.

While the present invention has been described with reference to a preferred embodiment, it should be appreciated by those skilled in the art that the invention may be practiced otherwise than is specifically described herein without departing from the spirit and scope of the invention. It is, therefore, to be understood that the spirit and scope of the invention be determined only by the appended claims.

I claim:

1. A method for manufacturing a workpiece with a rotation-symmetrically hardened surface area, comprising the steps of:

applying a carrier film with pulverized alloying elements onto a rotation-symmetrical surface area of a nonheated workpiece, rotating the workpiece about a rotation axis, radially infeeding and pressing at least one roll onto the carrier film on the surface area of the workpiece, and rolling the pulverized alloying elements of the carrier film into the surface area of the workpiece and using a pressing force of the rolling to generate necessary heat such that the alloying elements are intercalated in the surface of the workpiece and increase the hardness thereof, wherein the workpiece is hardened during the rolling step.

2. The method according to claim 1, wherein the rolling step is performed using a rotatable spindle.

3. The method according to claim 2, wherein the step of applying the carrier film is performed with the workpiece clamped on the spindle and with the workpiece rotating.

4. The method according to claim 1, wherein the surface area hardened is a profiled area and wherein the rolling is performed using at least one section roll.

5. The method according to claim 1, wherein said applying step is performed by spraying the pulverized alloying elements.

6. The method according to claim 1, wherein the pulverized alloying elements include metal carbides.

7. The method according to claim 1, wherein the pulverized alloying elements include ceramic nanocrystals.

8. The method according to claim 1, wherein the surface area hardened includes an internal tooth system of a gear.

9. The method according to claim 1, wherein the surface area hardened includes a cylindrical or a conical surface.

10. Apparatus for the manufacture of a workpiece with a rotation-symmetrical surface area which is to be hardened by pulverized alloying elements applied and rolled thereinto, comprising:

a spindle mounted to be rotatably driven about a center axis, a clamping mechanism for clamping the workpiece on the spindle, at least one spinning roll displaceable radially to the spindle axis for rolling the pulverized alloying elements into the nonheated workpiece using pressing force to generate necessary heat and for performing simultaneously a calibration process which largely avoids risk of thermal distortion, a hopper for pulverized alloying elements, an application device radially spaced from the spindle for applying the pulverized alloying elements from the hopper onto the surface area of the nonheated workpiece, and a supply device which supplies the pulverized alloying elements from the hopper to the application device.

11. Apparatus according to claim 10, wherein the application device is radially and/or axially adjustable relative to the spindle.

12. Apparatus according to claim 10, wherein the application device is commonly mounted with the spinning roll.

13. Apparatus according to claim 10, wherein the application device is a nozzle for spraying the pulverized alloying elements.

* * * * *